United States Patent
Cordan et al.

(10) Patent No.: US 8,224,611 B2
(45) Date of Patent: Jul. 17, 2012

(54) ONE PIN CALIBRATION ASSEMBLY AND METHOD FOR SENSORS

(75) Inventors: Ernest Cordan, Camarillo, CA (US); Robert Hunter, Ventura, CA (US); Michael Cornwall, Moorpark, CA (US)

(73) Assignee: Kavlico Corporation, Moorpark, CA (US)

( * ) Notice: Subject to any disclaimer, the term of this patent is extended or adjusted under 35 U.S.C. 154(b) by 387 days.

(21) Appl. No.: 12/402,296

(22) Filed: Mar. 11, 2009

(65) Prior Publication Data
US 2010/0235130 A1 Sep. 16, 2010

(51) Int. Cl.
*G06F 15/00* (2006.01)
(52) U.S. Cl. ........................................................ 702/107
(58) Field of Classification Search ............... 702/107, 702/85; 73/23.21, 864.73
See application file for complete search history.

(56) References Cited

U.S. PATENT DOCUMENTS

| | | |
|---|---|---|
| 4,734,885 A | 3/1988 | Luich |
| 4,747,048 A | 5/1988 | Mueller |
| 5,317,211 A | 5/1994 | Tang |
| 5,335,540 A | 8/1994 | Bowler |
| 5,617,040 A | 4/1997 | Matthews |
| 5,677,476 A * | 10/1997 | McCarthy et al. ........... 73/29.01 |
| 5,686,844 A | 11/1997 | Hull |
| 5,724,025 A | 3/1998 | Tavori |
| 5,805,466 A | 9/1998 | Roeckner |
| 6,100,841 A | 8/2000 | Toth |
| 6,167,528 A | 12/2000 | Arcoleo |
| 6,297,666 B1 | 10/2001 | Weingartner |
| 6,314,550 B1 | 11/2001 | Wang |
| 6,570,373 B1 | 5/2003 | Viola |
| 6,577,157 B1 | 6/2003 | Cheung |
| 6,619,141 B2 | 9/2003 | Danninger |
| 6,640,271 B2 | 10/2003 | Ehrenhardt |
| 6,717,396 B2 | 4/2004 | Viola |
| 6,736,540 B1 | 5/2004 | Sheehan |
| 7,265,559 B1 | 9/2007 | Hladky |
| 2006/0041854 A1 | 2/2006 | Schlanger |
| 2007/0069734 A1 | 3/2007 | Bertness |
| 2008/0081977 A1 | 4/2008 | Hayter |
| 2008/0300810 A1 | 12/2008 | Seesink |
| 2009/0177420 A1 * | 7/2009 | Fournier et al. ................. 702/59 |

FOREIGN PATENT DOCUMENTS

EP 1774270 B1 7/2008

OTHER PUBLICATIONS

International Search Report dated Dec. 4, 2009, in corresponding PCT Appl. No. PCT/US2009/060390.

* cited by examiner

*Primary Examiner* — Bryan Bui
(74) *Attorney, Agent, or Firm* — Gilman Clark & Hunter LLC

(57) ABSTRACT

Described herein is a sensor assembly that can be calibrated after manufacture and a method for calibrating that assembly. The assembly comprises a sense element, microprocessor and a protection circuit. The assembly can use pins on the existing connector to input calibration data. The present invention also is a method of calibrating sensor outputs using an assembly that contains a protection circuit to prevent the sensor assembly from electrostatic discharge and high and reverse voltage.

12 Claims, 2 Drawing Sheets

ONE PIN CALIBRATION ASSEMBLY AND METHOD FOR SENSORS

FIELD OF THE INVENTION

The present invention relates generally to calibrating pressure and temperature sensors and more specifically to calibrating sensor assemblies and methods of calibrating sensors.

BACKGROUND OF THE INVENTION

Calibrating sensors is well known in the art. Calibration is performed on individual sensors so that uniform output measurements can be obtained. Many prior art sensors are calibrated before final manufacturing steps have been completed. However, due to stresses created during the manufacturing process caused by the materials used, variation in the sensor elements and the environment, the output of the sensor may vary from sensor to sensor. Thus, it is preferred in the art to calibrate each sensor after the manufacturing has been completed so that each sensor has substantially the same uniform output when exposed to the same stresses such as pressure, temperature, position, etc.

SUMMARY OF THE PREFERRED EMBODIMENTS AND METHODS

In a preferred embodiment of the present invention, a method and assembly for calibrating a pressure sensor element is provided, wherein the calibration assembly comprises at least one protection circuit, a probe, a microprocessor and a multipin connector.

In a preferred method of the present invention, after the sensor assembly has been manufactured, a probe is attached to the sensor assembly. Once connected, the probe sends a signal to disable the protection circuit. By disabling the protection circuit, the microprocessor can be programmed through the pressure and temperature output pins on the sensor's connector allowing for two way communication on normally output only sensor signals.

The probe originated signal then informs the microprocessor to turn on its software calibration coefficient acceptance routine. The calibration coefficients are transmitted to the microprocessor via the reversed output signals transmitted through the protection circuit and a bypass line that bypasses the sensor assembly's signal filters or other conditioning circuitry present between the processor and the output protection device to load the coefficients into the non-volatile memory for use by the microprocessor's compensation routines to compensate for gain, linearity and temperature variations.

Specifically, in a preferred embodiment of the invention, the temperature output pin in the connector provides the coefficient data and the pressure output pin in the connector is used as a clock timing output to synchronize the signals in a standard two-wire digital communications protocol. In the case where a single output is used, such as a single pressure output, a standard one-wire digital communications protocol can be used, such as but not limited to SAE-J2716, as any standard one-wire digital communications protocol can be used.

One advantage of the present invention is that the sensor assembly can be calibrated through its existing connector after final assembly. A further advantage of the present invention is that there is a protection circuit that protects the output signals from over and reverse voltages as well as electrostatic discharge. Another advantage of the present invention is that the protection circuit enables the output signals to be used for calibration.

In a preferred embodiment the protection circuit protects the microprocessor from exposure to extreme over and under voltages and electrostatic discharge and other electrical stresses.

BRIEF DESCRIPTION OF THE DRAWINGS

The invention may be more readily understood by referring to the accompanying drawings in which like numerals refer to like parts and in which.

DETAILED DESCRIPTION OF THE PREFERRED EMBODIMENTS

Figure 1:
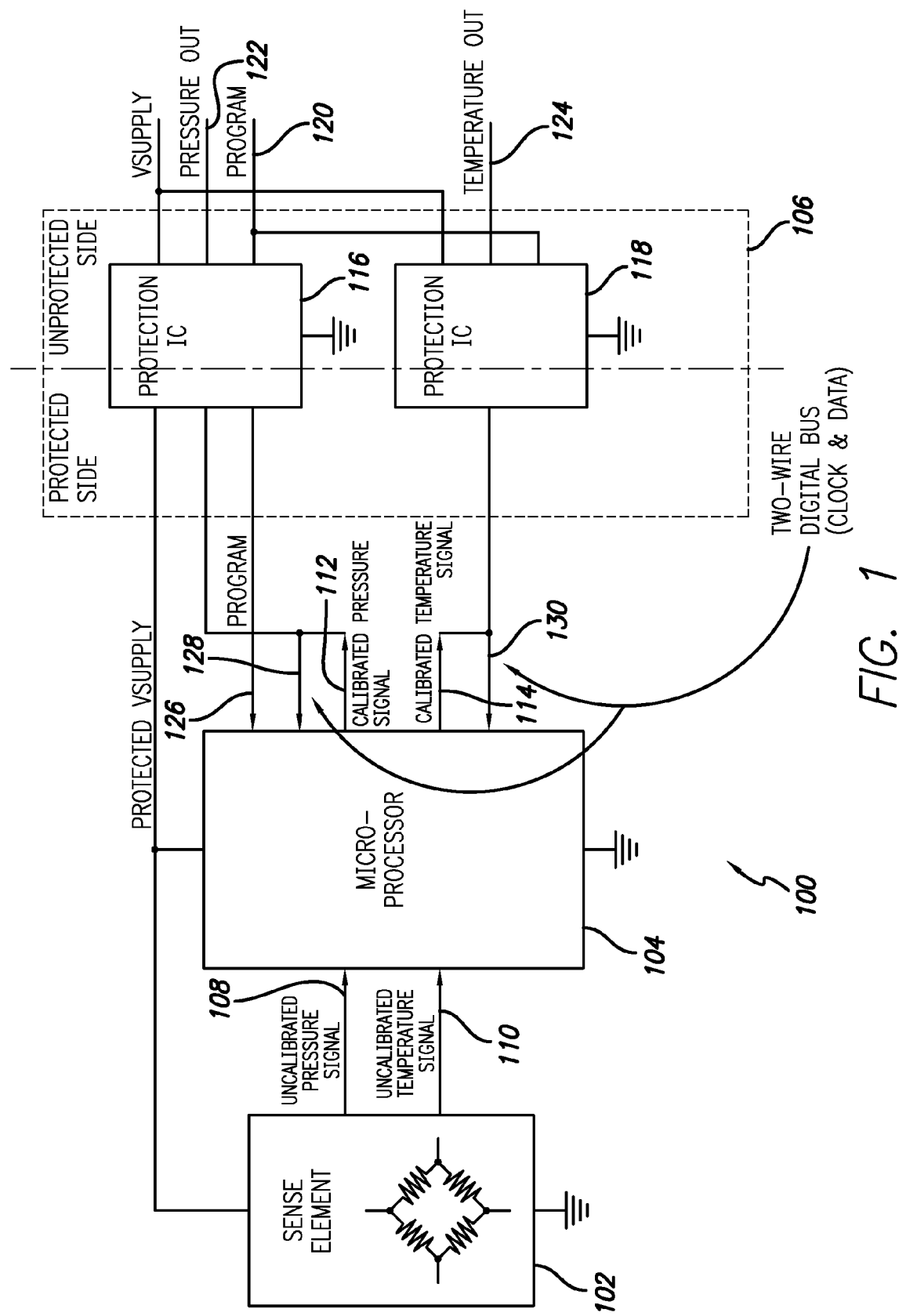
FIG. 1 is a block diagram of the sensor assembly in accordance with an embodiment of the present invention.

Generally, the present invention may be briefly described as follows. Referring to FIG. 1, a preferred embodiment of a sensor assembly 100 of the present invention is shown.

The sensor assembly 100 comprises a sense element 102, a microprocessor 104 and a protection circuit 106. The sense element is any type of sensor that can sense environmental changes such as, in a preferred embodiment, pressure and temperature. The outputs 108 and 110 of the sense element 102 are input into the microprocessor 104. Microprocessor 104 contains among other things compensation routines and a calibration coefficient acceptance routine. The microprocessor processes the outputs 108 and 110 of the sense element 102 to compensate for stresses such as gain, linearity, temperature and other well known stresses in the art.

The microprocessor 104 is connected to the protection circuit 106 through at least one low-pass filter (not shown) per microprocessor output. In a preferred embodiment where there are two environmental changes being sensed, the microprocessor has at least two outputs 112 and 114 which are connected through low-pass filters to the protection circuit 106. In this embodiment where there are two microprocessor outputs, the protection circuit comprises two protection integrated circuits 116 and 118. In a preferred embodiment the outputs of each of the two protection integrated circuits 120 and 122 are connected to certain pins on the sensor assembly connector (not shown).

In other embodiments in which there is only one environmental stress to be measured, only one output from the sense element needs to be measured and calibrated and thus only one protection integrated circuit is necessary.

In a preferred embodiment, the protection circuit protects the microprocessor from exposure to extreme over and under voltages and electrostatic discharge and other electrical stresses.

Figure 2:
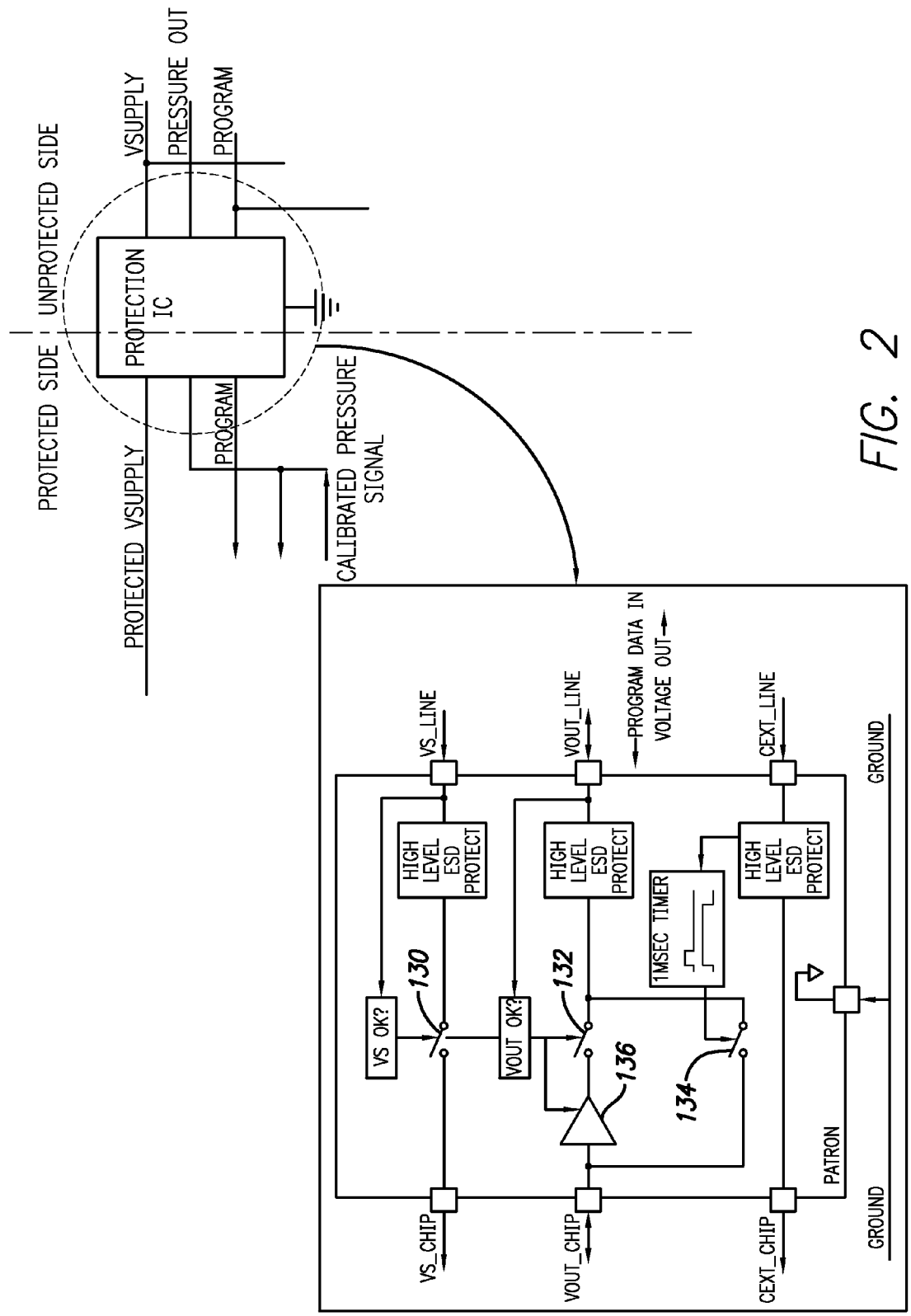
FIG. 2 is a schematic of a preferred embodiment of the protection integrated circuit of the present invention.

Referring next to FIG. 2, a preferred embodiment of a protection integrated circuit 116 shown in FIG. 1 is shown. The protection circuit operates as follows. When the $C_{ext}$ line receives a digital signal from the probe (not shown) the output signal $C_{ext\text{-}chip}$ from the protection circuit notifies the microprocessor to commence the calibration coefficient acceptance routines. At the same time, the signal from $C_{ext}$ also closes the connection 134 so that the signal from $V_{out}$ avoids driver 136 and instead enters the input of the microprocessor as $V_{out\text{-}chip}$ as the calibration data.

In addition, the protection circuit also protects the chip from receiving either extremely high voltages, electrostatic discharge or reverse voltage which will damage the chip. Specifically, when $V_{in}$ is too high, $V_{in}$ will cause the connection 130 to open to prevent the voltage from going to the microprocessor. $V_{in}$ will also open the connection 132 on the $V_{out}$ line to prevent it from damaging the microprocessor, as well. Likewise, if for some reason a large voltage or reverse voltage passes through the $V_{out}$ line, it will also open the connection to prevent the voltage from destroying the chip. In this manner, the microprocessor and sensor side of the assembly will also be protected.

Referring next to FIGS. 1 and 2, in a preferred calibration method of the present invention, after the sensor assembly 100 has been manufactured, a probe (not shown) sends a signal 120 to the microprocessor to disable the protection circuit 106. In a preferred embodiment of the present invention, the probe is connected to a pin in the assembly connector (not shown). By disabling the protection circuit 106, the microprocessor can be programmed through the pressure and temperature output pins 122 and 124 on the sensor's connector (not shown) allowing for two way communication on normally output only sensor signals.

The probe then sends a signal to the microprocessor 104 via input 126 which causes the microprocessor to begin its software calibration coefficient acceptance routine. The calibration coefficients are transmitted to the microprocessor via the reversed output signals transmitted through the protection circuit 106 and bypass lines 128 and 130 that bypasses the sensor assembly's bypass filters (not shown) to load the coefficients into the non-volatile memory for use by the microprocessor's compensation routines to compensate for gain, linearity and temperature variations.

Specifically, in a preferred embodiment of the invention, the temperature output 124 in the connector provides the thermal coefficient data and the pressure output pin 122 in the connector is used as a clock timing output to synchronize the signals.

In one embodiment of the present invention, once the microprocessor receives the calibration data, it disables the probe from receiving additional calibration data. The calibration data is then used to compensate for gain, linearity, temperature variations and the like.

One advantage of the present invention is that the sensor assembly can be calibrated through its existing connector after final assembly. Another advantage of the present invention is that the protection circuit protects the output signals from over and reverse voltages as well as electrostatic discharge. A further advantage of the present invention is that the protection circuit enables the output signals to be used for calibration.

Those skilled in the art will understand that this type of sensor can be used in the automotive, airplane, heating, ventilating, and air conditioning systems (HVAC) industries, among other applications.

The embodiments described above are exemplary embodiments of the present invention. Those skilled in the art may now make numerous uses of, and departures from, the above-described embodiments without departing from the inventive concepts disclosed herein. Thus, the construction of the embodiments disclosed herein is not a limitation of the invention. Accordingly, the present invention is to be defined solely by the scope of the following claims.

What is claimed is:

1. An assembly for calibrating a sensor comprising:
a sensor element having at least one output signal;
a microprocessor capable of generating at least one output signal and receiving at least two input signals;
a protection circuit receiving at least two input signals and generating at least two output signals; and
a probe connected to the protection circuit by an assembly connector for transmitting signals into the microprocessor through the protection circuit and for disabling the protection circuit to allow calibration data signals to be input into the microprocessor from the protection circuit via two-way communication on at least one pin in the assembly connector wherein the at least one pin is configured only as an output pin when the protection circuit is enabled.

2. The assembly of claim 1 wherein the microprocessor contains compensation routines and calibration coefficient acceptance routines.

3. The assembly of claim 1 further comprising low-pass filters for filtering compensated output signals from the microprocessor or other signal conditioning circuitry prior to their being input into the protection circuit.

4. The assembly of claim 1 wherein the sensor generates at least two output signals which are processed by the microprocessor.

5. The assembly of claim 4, wherein the protection circuit comprises at least two protection integrated circuits, one for each of the output sensor signals.

6. The assembly of claim 1 wherein after the microprocessor receives the calibration data signals, all signals input into the microprocessor from the sense element are compensated in accordance with the calibration data.

7. A calibration method for a sensor assembly having a sense element configured to send sensory signals, a microprocessor, and a protection circuit, the method comprising the steps of:
attaching a probe to the sensor assembly which sends a signal to disable the protection circuit thereby allowing two way communication through the protection circuit;
enabling the microprocessor's software calibration coefficient acceptance routine;
transmitting calibration coefficients from the probe to the microprocessor via the protection circuit; and
storing the calibration coefficients in the non-volatile memory of the microprocessor such that the microprocessor calibrates the sensory signals received from the sense element.

8. The method of claim 7, further comprising the step of bypassing any of the sensor assembly's filters or signal conditioning circuitry.

9. The method of claim 7, further comprising the step of, wherein once the microprocessor receives the calibration coefficients, it does not accept additional calibration coefficients.

10. The method of claim 7, further comprising the steps of using the calibration coefficients to compensate for factors comprising offset, gain, linearity, and temperature variations.

11. A method of calibrating a sensor assembly comprising at least a sensor, a microprocessor, a memory, a protection circuit and an output connector, the method comprising:

connecting a probe to at least a single pin of the output connector;

providing calibration coefficients from the probe to the single pin;

loading the calibration coefficients into the memory, wherein the calibration coefficients are used by the microprocessor to compensate for a variation in the sensor assembly; and protecting the sensor assembly from over and reverse voltages and electrostatic discharge.

12. The method of claim 11 wherein the variation in the sensor assembly is selected from the group consisting of gain, linearity and temperature variations.

* * * * *